(12) United States Patent
Gaillet et al.

(10) Patent No.: US 10,962,947 B2
(45) Date of Patent: Mar. 30, 2021

(54) DEVICE FOR REMOTELY CONTROLLING AN APPLIANCE

(71) Applicant: Orange, Paris (FR)

(72) Inventors: Thierry Gaillet, Sceaux (FR); Sylvain Leroux, Paris (FR)

(73) Assignee: ORANGE, Paris (FR)

(*) Notice: Subject to any disclaimer, the term of this patent is extended or adjusted under 35 U.S.C. 154(b) by 118 days.

(21) Appl. No.: 16/288,619

(22) Filed: Feb. 28, 2019

(65) Prior Publication Data
US 2019/0271958 A1 Sep. 5, 2019

(30) Foreign Application Priority Data
Mar. 2, 2018 (FR) ...................................... 1851820

(51) Int. Cl.
*G05B 19/042* (2006.01)
*G08C 17/02* (2006.01)

(52) U.S. Cl.
CPC ........... *G05B 19/042* (2013.01); *G08C 17/02* (2013.01); *G05B 2219/23462* (2013.01); *G08C 2201/30* (2013.01)

(58) Field of Classification Search
CPC ............................ G08C 17/02; G08C 2201/30
USPC ........................................................ 700/275
See application file for complete search history.

(56) References Cited

U.S. PATENT DOCUMENTS

| 9,414,125 B2 | 8/2016 | Ferren et al. | |
|---|---|---|---|
| 2003/0103088 A1* | 6/2003 | Dresti | H04N 21/4131 715/835 |
| 2007/0229465 A1 | 10/2007 | Sakai et al. | |
| 2015/0364037 A1* | 12/2015 | Lee | G08C 17/02 348/158 |
| 2016/0094702 A1* | 3/2016 | Ariel | H04M 1/72533 455/420 |
| 2016/0124402 A1* | 5/2016 | Demskie | G05B 15/02 700/275 |
| 2018/0081331 A1* | 3/2018 | Gary, Jr. | G05B 15/02 |
| 2019/0132436 A1* | 5/2019 | Jang | H04W 4/12 |

OTHER PUBLICATIONS

French Search Report and Written Opinion dated Oct. 31, 2018 for corresponding French Application No. 1851820, filed Mar. 2, 2018.
English Translation of French Search Report and Written Opinion dated Oct. 31, 2018 for corresponding French Application No. 1851820, filed Mar. 2, 2018.

* cited by examiner

*Primary Examiner* — Md Azad
(74) *Attorney, Agent, or Firm* — David D. Brush; Westman, Champlin & Koehler, P.A.

(57) ABSTRACT

A device, which is intended to remotely control at least one operation of at least one appliance, includes an input interface module for receiving inputs from a user, and a communication module for sending to a management platform data which represent a control instruction activated by the user. Such a device can have universal remote control functionality, with an additional contextualization functionality.

17 Claims, 3 Drawing Sheets

DEVICE FOR REMOTELY CONTROLLING AN APPLIANCE

TECHNICAL FIELD OF THE INVENTION

The present invention relates to a device for remotely controlling at least one appliance, and preferably such a device which may have a universal remote control function.

BACKGROUND OF THE INVENTION

Individuals and companies increasingly need to control appliances which are installed in a variety of premises, such as residential premises or business premises. These appliances are for example rolling shutters, domestic robots, lighting systems, heating systems, ventilation systems, surveillance or security systems, etc. They may belong to the home automation sector or to the economic business sector of the premises. Generally, such appliances can be controlled by separate remote controls which are dedicated to each of them, or by applications which can be accessed on smartphones, or on tablets.

Now, the set of remote controls and applications which are necessary for all the appliances of one and the same premises can be significant in number, such that the use of some of these remote controls or applications becomes a source of confusion, and requires the user to consult manuals each of which is specific to one of the appliances. Significant wastes of time result therefrom.

From this situation, there is therefore a need for a user to be able to easily and rapidly remotely control a multiplicity of appliances.

This need relates more particularly to a common remote control which is compatible with multiple appliances.

SUMMARY OF THE INVENTION

To address this need, or another, according to a first aspect, a device is proposed which is intended to remotely control at least one operation of at least one appliance, and which comprises:

- a processor, which is operationally coupled to a memory, and which is suitable for determining a control instruction for the appliance on the basis of a combination of several control instruction elements displayed on a face of the device, by configuration of different parts of the face on which are respectively inscribed the control instruction elements, these different parts of the face being juxtaposed in the face to form the combination of the control instruction elements;
- an inscription module, which is suitable for inscribing, under the control of the processor, the control instruction elements on the respective parts of the face of the device;
- an input interface module, which is suitable for receiving inputs from a user, this input interface module comprising a detection module suitable for detecting an activation of the control instruction of the appliance by a user; and
- a communication module, which is suitable for sending, to a management platform via a communication network, data which represent the control instruction activated by the user.

The operation of the appliance can then be controlled in accordance with the control instruction which has been activated by the user, from the data which represented this control instruction as they were transmitted by the device to the management platform.

Thus, the device of the invention is suitable for proposing control instructions to the user, and for receiving activations made by the user of some of these control instructions. Such a device is compatible with a great number of different appliances, and can be shared between several appliances, in particular through the use of the management platform. It can thus replace multiple remote controls which would be dedicated separately to these appliances. The device of the invention can thereby fulfil a universal remote control function. All the appliances can then be remotely controlled according to the same instruction logic, which provides the user with general ease of use and significant time saving.

The use of the management platform also makes it possible to easily communicate with the appliances to be remotely controlled, particularly when these appliances are connected to platforms which are dedicated to them, in the manner which is commonly referred to as internet of things, or IoT. Furthermore, the use of these platforms dedicated to the appliances, in combination with the management platform and the device of the invention, makes it possible to easily use the functionality enhancements which are made available, via these dedicated platforms, by the manufacturers or the managers of these appliances.

Furthermore, the inscription module makes it possible to vary the control instruction elements which are inscribed on at least some of the face parts of the device, for example according to the appliances which are intended to be remotely controlled by means of the device. In this way, the universal remote control function of the device is further augmented.

The inscription module, in cooperation with the processor, can also vary the control instruction elements which are inscribed on at least some of the face parts of the device according to a context which exists at the time of use of the device. This context may take into account various parameters, such as the time, the location, the current status of some of the appliances, results of measurements of ambient conditions, prior learning of habits of the user, etc. Thus, the universal remote control function of the device may be combined with a contextualization function.

Generally for the invention, at least one of the control instruction elements, which is inscribed on one of the parts of the face of the device, may be thematic and designate at least one type of appliance concerned with the control instruction in which this control instruction element participates. Furthermore, at least one other of the control instruction elements, which is inscribed on another of the parts of the same face of the device, may be of action type and designate an operation command for at least one appliance of the type which is designated by the thematic control instruction element, in one and same control instruction. Such a mode of construction of each control instruction, through the combination of a thematic control instruction element with a control instruction element of action type, without limitation relative to other additional control instruction elements which could also participate in forming the control instruction, is simple for the user to learn and makes it possible to provide the user with a great number of different control instructions. The use of the device is then easy, intuitive and rapid.

In preferred embodiments, at least some of the face parts of the device may be provided with respective displays, these displays being driven by the inscription module. In this case, the communication module can be suitable for receiving, from the management platform, control instruction elements which are available to be used with the device. Then, the inscription module can also be suitable for inscribing at least some of the available and received control instruction elements on at least some of the face parts which are provided with displays, according to an assignment to the face parts of these available and received control instruction elements. In this way, the device can be simpler, since some of the data or information which are necessary to its operation is determined by the management platform, and sent by the latter to the device. The complexity of the device, its cost and its energy consumption can thereby be reduced, since the tasks involved, including the storage tasks, are executed by the management platform.

The assignment of the control instruction elements to the face parts of the device may be determined by the device itself. However, for preferred embodiments with displays, the communication module may also be suitable for receiving, from the management platform, data which specify the assignment of each available and received control instruction element to one of the face parts of the device. Then, the data which represent the control instruction activated by the user, and which are returned by the communication module to the management platform, may comprise an identification of at least some of the face parts which correspond, according to the assignment, to the control instruction elements of the control instruction which has been activated by the user. Thus, all the management of the control instruction elements relative to the appliances to be remotely controlled and/or to a context of use of the device can be performed in the management platform, such that the device is now no more than a display and input interface. Such a device can then be simpler, and its universal remote control function can be further augmented in this way relative to the appliances to be remotely controlled.

Also, for embodiments with displays, the processor may also be configured to, in a standby state of the device, assign at least some of the faces of this device to distinct appliances or to distinct appliance functions and to command the inscription module to display on at least one of the faces of the device at least one out of:
- a current state of operation of the appliance to which the face is assigned,
- a current state of activation of the appliance function to which the face is assigned,
- a value of a parameter which is affected by the appliance to which the face is assigned, or which is affected by the appliance function to which the face is assigned, and
- information which relates to the appliance to which the face is assigned, or which relates to the appliance function to which the face is assigned.

Generally for the invention, the device may also be configured to allow the user to control a setting or a value of a parameter which is applicable to the device, the device then itself appearing as an additional appliance whose operation is controlled by means of this device.

In first embodiments, the device may comprise several faces which are assigned respectively to distinct types of appliance, to distinct appliances or to distinct appliance functions. Then, the device may also be configured to present to the user on at least one of these faces at least one control instruction which relates to the type of appliance, to the appliance or to the appliance function corresponding to this face. In this case, the input interface module is also suitable for allowing the user to activate the control instruction of this face. Such one-to-one assignment of the faces of the device to the types of appliance, appliances or appliance functions makes the device more intuitive and easier to use.

Preferably, for these first embodiments, the detection module may comprise at least one sensor, in particular a touch sensor or a pressure sensor, which is arranged on one of the face parts of the device, on which face part is inscribed one of the control instruction elements. This sensor may then be suitable for detecting an action of activation of the control instruction which is performed by the user. On detection of the activation action, the sensor, in cooperation with the processor, can trigger a sending by the communication module to the management platform of the data which represent the control instruction activated by the user.

Preferably for the first embodiments, the device may have a substantially cubic form or a rectangular parallelepipedal form, with six faces which are available to be assigned separately to distinct appliance types, distinct appliances or distinct appliance functions, affected by the control instructions of the device.

In second embodiments, the device may comprise several blocks, of which at least one is mobile relative to at least one other of the blocks, and the mobile block may comprise several faces which each form a distinct face part of the device. Then, a displacement, by the user, of the mobile block relative to at least one other of the blocks of the device modifies those of the face parts which are juxtaposed to determine the control instruction. In this case, the input interface module is suitable for detecting the face parts which are juxtaposed by the user to select the control instruction. Such second embodiments allow the user to compose the control instruction that he or she will activate, by displacing the blocks of the device to select the control instruction elements that he or she juxtaposes.

Possibly for some of the second embodiments, the device may also be configured to, on detection that the user has grasped the device:
- identify a face of the device, called active face, that the user presents to modify the control instruction which appears on this active face; and
- inscribe on at least one face part which does not appear on the active face, but which is available to be brought by the user into the active face by displacement of the mobile block, a control instruction element which is available to be selected by the user by bringing into the active face the face part on which is inscribed this available control instruction element.

Such second embodiments combine an enhanced visualization of the control instruction elements which are available, to simplify the operation of composition of the particular instruction of these control instructions that he or she will activate.

Preferably for the second embodiments, the device may be arranged such that the blocks are each mobile relative to at least one other of the blocks of the device by rotation about an axis which is common to all the blocks.

Also possibly for some of the second embodiments, a first of the blocks may be dedicated to displaying thematic control instruction elements, and a second of the blocks may be dedicated to displaying control instruction elements of action type.

A second aspect of the invention proposes a method for remotely controlling an operation of at least one appliance, the method comprising the following steps, executed by means of a device which is in accordance with the first aspect of the invention:
/1/ establishing a data communication link between the device and a management platform;

/2/ receiving from the management platform data for configuring at least some of the face parts of the device by assigning control instruction elements to these face parts;

/3/ inscribing the control instruction elements on the face parts to which these control instruction elements are assigned;

/4/ receiving an input from a user, and activating a control instruction which appears on a face of the device, called active face, on the basis of the user input received; and /5/ sending to the management platform data which represent the control instruction which has been activated by the user.

In one or more of the embodiments for which the device comprises displays on at least some of its face parts, the method may also comprise:

receiving, from the management platform, the control instruction elements to be inscribed on at least some of the face parts which are provided with displays;

inscribing, on these face parts which are provided with displays, the control instruction elements received from the management platform; and optionally, when a current use of the device is detected, inscribing, on at least one face part which is in the active face, or which is available to be brought into the active face by the user, a control instruction element which is available as replacement for another control instruction element inscribed previously on a face part of the active face.

Furthermore, generally for the invention, the activation of the control instruction which appears on the active face may comprise determining a new control instruction to be applied to the appliance on the basis of a detection of a modification, by the user, of the combination of control instruction elements which appears on the active face of the device. In this case, the sending to the management platform of the data which represent the control instruction which has been activated by the user comprises sending to the management platform data which represent the control instruction elements of the new control instruction.

BRIEF DESCRIPTION OF THE DRAWINGS

Other particular features and advantages of the present invention will become apparent from the following description of nonlimiting exemplary embodiments, with reference to the attached drawings, in which.

DETAILED DESCRIPTION OF INVENTION EMBODIMENTS

Figure 1:
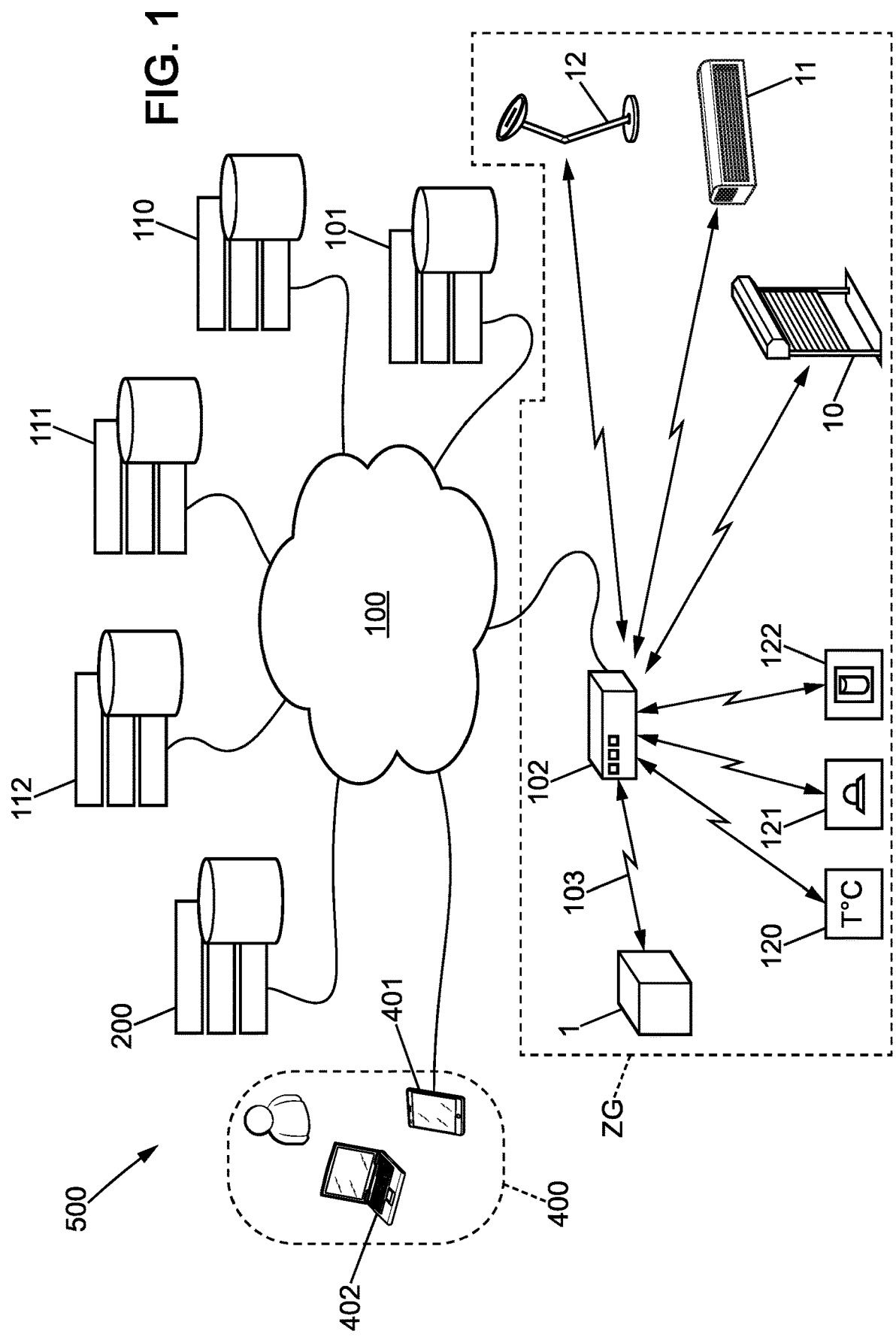
FIG. 1 is a block diagram of the elements that are necessary to implement a device according to one or more embodiments.

For reasons of clarity, the dimensions of the elements which are represented in these figures correspond neither to real dimensions nor to real dimensional ratios. Furthermore, identical references which are indicated in different figures designate identical elements or elements which have identical functions.

Furthermore, a person skilled in the art may realise that the teachings herein can be implemented in different forms according to different embodiments, and that the structures and/or functions described hereinbelow represent only some particular embodiments. In particular, a person skilled in the art will understand that an aspect of the devices, platforms, appliances and methods described herein can be implemented independently of other aspects, and that different aspects can be combined in different ways.

The present description refers to functions, units, modules, platforms and diagrams of the methods and devices according to one or more embodiments. Each of the functions, units, modules, platforms and diagrams described may be implemented in hardware or software form, including in the form of embedded software, referred to as "firmware", or in the form of "middleware", or microcode, or any combination thereof. In the case of an implementation in software form, the functions, units, modules and/or diagrams may be implemented by computer program instructions or software code, which may be stored on or transmitted to a computer-readable medium, including a non-transient medium, or a medium loaded into memory of a generic or specific computer, or of any other programmable data processing appliance or device for producing a machine, such that the computer program instructions or the software code executed on the computer or programmable data processing device constitute means for implementing these functions.

The embodiments of a computer-readable medium include, non-exhaustively, information storage media and communication media, including any medium facilitating the transfer of a computer program from one place to another. "Information storage medium" should be understood to mean any physical medium that can be accessed by computer. The examples of information storage medium include, in a nonlimiting manner, discs or flash memory components, or any other flash memory devices, such as, for example, USB keys, memory keys, memory sticks, key discs, CD-ROMs, or other optical data storage devices, DVDs, magnetic disc data storage devices or other magnetic data storage devices, data memory components, RAM, ROM, EEPROM memories, memory cards, commonly referred to as "smart cards", memories of SSD (Solid State Drive) type, or any other form of medium that can be used to transport or store or memorize data or data structures which can be read by a computer processor.

Furthermore, various forms of computer-readable medium can transmit or carry instructions to computer equipment, such as a router, a gateway, a server, or any communication module, whether it be wired transmission (by coaxial cable, optical fibre, telephone wires, DSL cable, or Ethernet cable), wireless (by infrared, radio, cellular, microwave), or virtualized transmission modules (virtual router, virtual gateway, virtual tunnel end, virtual firewall). The instructions may, depending on the embodiments, comprise code of any computer programming language or computer program element, such as, without limitation, the assembly, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting languages.

Furthermore, the terms "in particular", "for example", "example", "typically" are used herein to denote examples or illustrations of nonlimiting embodiments, which do not necessarily correspond to preferred or advantageous embodiments compared to other possible aspects or embodiments.

"Platform" or "server" is understood herein to mean any service point, virtualized or not, or a device applying data processing operations, one or more databases, and/or data communication functions. For example, and in a nonlimiting manner, the term "platform" or the term "server" may refer to a physical processor coupled operationally with associated communication, database and data storage functions, or refer to a network, a group, a set or a complex of processors and data storage equipment and associated networking, as well as an operating system and one or more database system(s) and application software in support of the services and functions provided by the server. A computer device may be configured to send and receive signals, by wireless and/or wired transmission network(s), or may be configured to process and/or store data or signals, and can therefore operate as server. Thus, equipment configured to operate as server may include, as nonlimiting examples, dedicated rack-mounted servers, office computers, laptop computers, service gateways, sometimes called "boxes" or "residential gateways", multimedia decoders, sometimes called "set-top boxes", integrated equipment combining various functionalities, such as two or more of the functionalities mentioned above. The platforms may vary greatly in their configurations or their capabilities, but a platform will generally include one or more central processing unit(s) and a memory. A platform may also include singular or multiple mass memory equipment, one or more electrical power supply (supplies), one or more wireless and/or wired network interface(s), one or more input/output interface(s), one or more operating system(s), such as Windows Server, Mac OS X, Unix, Linux, FreeBSD, or an equivalent.

The terms "network" and "communication network" as used herein refer to one or more data links which can couple or connect equipment, possibly virtualized, so as to allow electronic data to be transported between computer systems and/or modules and/or other devices or electronic equipment, such as between a platform and a device according to the invention, or other types of devices, including between wireless devices coupled or connected by a wireless network, for example. A network may also include a mass memory for storing data, such as an NAS, for "network attached storage", an SAN, for "storage area network", or any other form of medium that can be read by a computer or by a machine, for example. A network may comprise, wholly or partly, the Internet network, one or more local area networks, or LANs, or one or more networks of WAN, for "wide area network", type, connections of wired type, connections of wireless type, of cellular type, or any combination of these different networks. Similarly, subnetworks may use different architectures or conform to or be compatible with different protocols, and interoperate with networks of larger size. Different types of equipment may be used to make different architectures or different protocols interoperable. For example, a router may be used to provide a communication link or a data link between two LANs which would otherwise be separate and independent.

The terms "operationally coupled", "coupled", "mounted", "connected", "in cooperation" and their variants and various forms used herein refer to couplings, connections, mountings, which may be direct or indirect, and comprise in particular connections between electronic equipment or between portions of such equipment which allow operations and functions as described herein. Furthermore, the terms "connected" and "coupled" are not limited to physical or mechanical connections or couplings. For example, an operational coupling may include one or more wired connection(s) and/or one or more wireless connection(s) between two or more pieces of equipment which allow simplex and/or duplex communication links between the equipment or the portions of equipment. According to another example, an operational coupling or a connection may include a coupling by wired and/or wireless link to allow data communications between a server of the proposed system and another piece of equipment of the system.

The terms "application" or "application programme" (AP) and their variants ("app", "webapp", etc.) as used herein correspond to any tool which operates and is operated by means of a computer, to provide or execute one or more function(s) or task(s) for a user or another application programme. To interact with an application programme, and control it, a user interface may be provided on the equipment on which the application programme is implemented. For example, a graphical user interface, or GUI, may be generated and displayed on a screen of the user equipment, or an audio user interface may be played back to the user by using a loudspeaker, a headset or an audio output.

FIG. 1 is a diagram illustrating an embodiment in which a system 500 comprises a device as proposed herein and designated by the reference 1, configured to communicate with a management platform 101 through a network or several network(s) comprising a communication network 100, to which a service gateway 102, or "box", is connected. The device 1 will preferably be configured for its communication link 103 with the service gateway 102 to be of wireless type, for example by using the "WiFi®" data communication technology, or the Zigbee® technology, or even a wireless communication technology of Bluetooth® type (and in particular the Bluetooth Low Energy®, or BLE technology), or Z-Wave® or a communication protocol of IEEE 802.15.4 type. The use of a wireless connection over the communication section which culminates at the device 1 in effect allows unfettered manipulation of the device 1 by a user.

Depending on the embodiment, the device 1 and the management platform 101 may be interconnected and exchange data over one or more communication link(s), by using one or more network(s) of different types, such as a fixed network, a cellular network (for example according to the 2G (GSM, GPRS, EDGE), 3G (UMTS), 4G (LTE), LTE-A, LTE-M, CDMA, CDMA2000, HSPA, 5G standard, or their variants or evolutions), another type of radio network (for example WiFi® or Bluetooth®), an IP network, a combination of several of these networks, etc. For that, the device 1 and the management platform 101 will be configured with appropriate data communication means.

A resource space (processing, memory, etc.) is thus assigned to the device 1 in the management platform 101. In the embodiment illustrated by FIG. 1, the management platform 101 is connected to the network 100, so that data can be transmitted between the platform 101 and the device 1. In one or more embodiments, the management platform 101 may be hosted by one or more servers, for example in a cloud. This or these server(s), which may be any type of equipment or a system comprising data processing means, such as a computer, a set of interconnected computers (in a virtualized network context for example), and comprise and/or be connected to one or more databases for storing data, may be configured to exchange data with one or more device(s) 1, and in particular receive from one or more device(s) data representing at least one instruction controlling an operation of at least one appliance.

In one or more embodiments, the management platform 101 may be provided with an application programming interface (API), or any other type of interface (not represented in FIG. 1), configured to transmit to and receive data from one or more device(s), and in particular receive data representing at least one instruction controlling the operation of at least one appliance.

In one or more embodiments, the system 500 comprises one or more appliance(s) or object(s), for example home automation appliances such as a rolling shutter 10, an air conditioner 11 and a standard lamp 12, which are cited as examples (illustrated in FIG. 1) without limitation as to their nature and their number, which may respectively be connected to dedicated platforms managing connected objects 110, 111, 112, for example through the communication network 100, as illustrated in FIG. 1. The connection of each of the appliances or objects connected to the network 100 may also be done via the gateway 102, but not necessarily. The appliances which are intended to be controlled by means of the device 1, comprising the appliances 10-12 by way of illustration, may be situated in or in proximity to a limited geographic zone, denoted ZG. For example, such a zone ZG may be residential premises. It is understood that although the device 1 and the method for remotely controlling an appliance, in accordance with the invention, are described for home automation appliances installed in residential premises, they can be implemented without limitation with all types of appliances.

In one or more embodiments, each dedicated platform may also be hosted by one or more servers, for example in a cloud. In the embodiment illustrated by FIG. 1, a resource space (processing, memory, etc.) is assigned in the platform 110 to the rolling shutter 10, a space in the platform 111 is assigned to the air conditioner 11, and a space in the platform 112 is assigned to the standard lamp 12. The platforms 110-112 managing the connected objects may be managed by the respective providers of the appliances 10, 11, 12, but not necessarily. Each of the platforms 110-112 has operating data of the corresponding appliance, and can communicate with it via the network 100, in particular by using application programming interfaces, or APIs. In particular, each of the platforms 110-112 may be provided with an API and data communication means configured to communicate with the supervised appliance to remotely trigger an operation of the corresponding appliance, to communicate information relating to this appliance to another platform, and to communicate data with the management platform 101.

The system 500 may also comprise connected objects generating data, such as sensors, such as, for example, the temperature sensor 120, the brightness sensor 121, and the presence sensor 122 illustrated in FIG. 1, and which are cited by way of nonlimiting examples as to their nature and their number. In one or more embodiments, these sensors are configured to transmit data to the management platform 101, for example through the communication network 100 with, possibly, also dedicated resource spaces in platforms (not represented). The connection of each of the sensors to the communication network 100 may vary according to the embodiment and the sensor. For example, the temperature 120, brightness 121 and presence 122 sensors may be connected to the network 100 by a wireless network of WPAN (Wireless Personal Area Network) type by using a wireless communication technology of Bluetooth® type (and in particular the Bluetooth Low Energy®, or BLE type), Zigbee®, or Z-Wave® or a communication protocol of IEEE 802.15.4 type. A function for monitoring contents which are likely to be managed and/or generated by an online service, to appear on a social network or on the Internet network, and which is executed by a terminal connected to the communication network 100, may also constitute a sensor in the context described herein.

The system 500 of FIG. 1 may comprise a set 400 of equipment or of user functions 401, 402, configured to provide a management user interface (comprising in particular the configuration, the driving, the use and the control) of the device 1. The users, via their online services (for example via their social network), via their user equipment, via applications on their smartphone(s) or Webapps, that is to say applications that can be executed from a browser, on their computer(s), and/or their messaging service(s), can thus interact with the device 1.

In one or more embodiments, the user equipment 401, 402 may be configured to communicate by wireless network, for example of WiFi® type, with the service gateway 102, to exchange data with the management platform 101. Depending on the embodiment, an application configured for the management, comprising in particular the configuration, the driving, the use and the control, of one or more device(s) 1, also called companion application, will be able to be executed by the user equipment 401, 402. The companion application will be able to comprise a user interface for the user commands of the device(s). The user equipment 401, 402 is then adapted to implement the companion application, and typically comprises a screen, for example a touchscreen, to display a graphical user interface, or GUI, of the companion application, a microphone for recording voice commands and other input interfaces configured according to the embodiment of the companion application for inputting user commands of the application.

In one or more embodiments, the user equipment 401, 402 may comprise a memory, a processing unit, equipped with a processor for example, and driven by an application, in particular the companion application dedicated to the control and/or the configuration of one or more device(s) 1, or a computer program, configured to implement one or more embodiment(s) of the proposed methods.

On initialization, the code instructions of the computer program are for example loaded into a RAM memory before being executed by the processor of the processing unit. The processor of the processing unit is configured to implement the control method according to at least one embodiment, according to the instructions of the computer program, to exchange data with the management platform 101 in order to control one or more device(s).

The user equipment 401, 402 may be a portable telephone, for example a smartphone, a tablet, a computer, an electronic component, or another appliance comprising a communication module, a user interface module (comprising for example a screen, a microphone, a loudspeaker, a keyboard) and a processor coupled operationally to a memory, and, according to the embodiment chosen, other associated hardware elements like a network interface and a medium reader for reading a removable storage medium and writing onto such a medium (not represented in the figure). The removable storage medium may be, for example, a compact disc (CD), a digital video/multipurpose disk (DVD), a flash disk, a USB key, etc. According to the embodiment, the memory or the removable storage medium contains instructions which, when they are executed by the processing unit, cause this processing unit to exchange data with the management platform 101 according to at least one implementation of the proposed remote control method.

According to the embodiment, the driver module of the device 1 with which the user equipment 401, 402, is typically provided, implemented through the companion application, as described above in connection with one or more embodiments, will be able to be configured to communicate with the management platform 101, for example via the network 100. Conversely, in one or more embodiments, the management platform 101 will be able to be provided with an API configured to exchange data with one or more device(s) 1, for example configuration applications respectively executed on singular or multiple user equipment 401, 402.

For example, the user equipment 401, 402 may be used to associate with a device 1 one or more appliance(s) which is (are) intended to be remotely controlled by means of this device 1. Identifiers of these appliances can then be stored in the management platform 101 linked to an identifier of the device 1. The appliances which are to be thus associated with the device 1 may be declared by an automatic procedure, based in particular on a geolocation of these appliances, or by the user by selecting those of the appliances that he or she wants to remotely control by means of the device 1.

In one or more embodiments, the configuration (initial configuration or reconfiguration) of a device 1 will be able to be controlled by the management platform 101, and configuration data will be able to be placed in memory in the management platform 101, for example linked with a profile comprising an identifier and configuration data.

Depending on the embodiment, a configuration profile will be able to be defined linked with a device 1, or be defined linked with a user or a group of users, to be applied to one or more device(s) 1. The configuration profile will be able to contain one or more identifier(s) of device(s) 1 and/or a user identifier. A hierarchical structure of different profiles will also be able to be used to define levels of access to configuration functions of a device 1, and/or configuration priority levels.

For example, a user A having a higher profile than a user B will be able to have access to a greater number of configuration functionalities than the user B. To return to the example of FIG. 1, in a domestic context comprising adults and children, the adults will be able to define a profile for themselves making it possible to control all the functionalities of the device 1, and in particular the state of operation of all of the equipment or appliances 10, 11, 12, while the infants will be able to have a profile not allowing them to use the standard lamp 12. In a professional context, a manager or team leader will be able to have a higher configuration profile than the members of his or her team, and thereby be able to access a greater number of appliances and configuration functionalities of one or more device(s) 1.

The definition of profiles associated with devices advantageously makes it possible to define hierarchical levels between different devices, such as, for example, a "master" or "administrator" level and a "slave" or "standard" level. Such different hierarchical levels associated with the respective profiles of devices advantageously make it possible to drive a set of devices via a single one of them. For example, for a group of N devices, it may be advantageous to define an "administrator" profile for one of these N devices, and a "standard" profile for the N-1 other devices. The different levels defined in the profiles respectively associated with the devices may for example cause, through configuration, the control instructions produced from the "administrator" device to be reflected on the "standard" devices via the management platform 101.

For example, on reception of data of a control instruction originating from one device out of a plurality of devices, the devices of the plurality of devices operating according to one of the embodiments described herein, the management platform may, in one or more embodiments, be configured to recover the profile of the device having transmitted the data, and determine a hierarchical level associated with this profile. In the case where the determined hierarchical profile corresponds to a higher level in the predefined hierarchy of the profiles, the management platform may be configured to transmit all or part of the control instruction data associated with this device to the other devices of the plurality of devices having a hierarchical level associated with their profile which is lower than the hierarchical level of the device from which the control instruction originates. This method advantageously makes it possible to wholly or partly pre-empt the operation of devices of a plurality of devices by definition of hierarchical levels associated with a profile, through one or more device(s) with which a higher level (called "master" or "administrator" for example) in the hierarchy has been associated.

In one or more embodiments, a device with which a profile of a first level in a predefined hierarchy of profiles is associated, may be driven, and in particular receive control instructions, in different ways: from a device with which a profile of a second level higher than the first level in the predefined hierarchy is associated, and from an application executed on a user equipment item, as described herein, in both cases via the management platform.

The system 500 illustrated in FIG. 1 may also comprise one or more external platform(s) 200, for example of data server type, or "data lake" or "data sets" type, comprising one or more database(s), and which may be configured to supply a variety of information to the management platform 101, in particular also via the communication network 100. Such information may relate, without the following examples being limiting, to meteorological data, to road traffic data, to the occurrence of events which are selected through a predetermined filter, etc.

In one or more embodiments, the device 1 has a data communication link with the management platform 101, for example by means of an appropriate API, and the management platform 101 has a data communication link with each of the platforms 110-112, 200 and with those of the sensors 120-122, by means of other appropriate application programming interfaces.

Figure 2A:
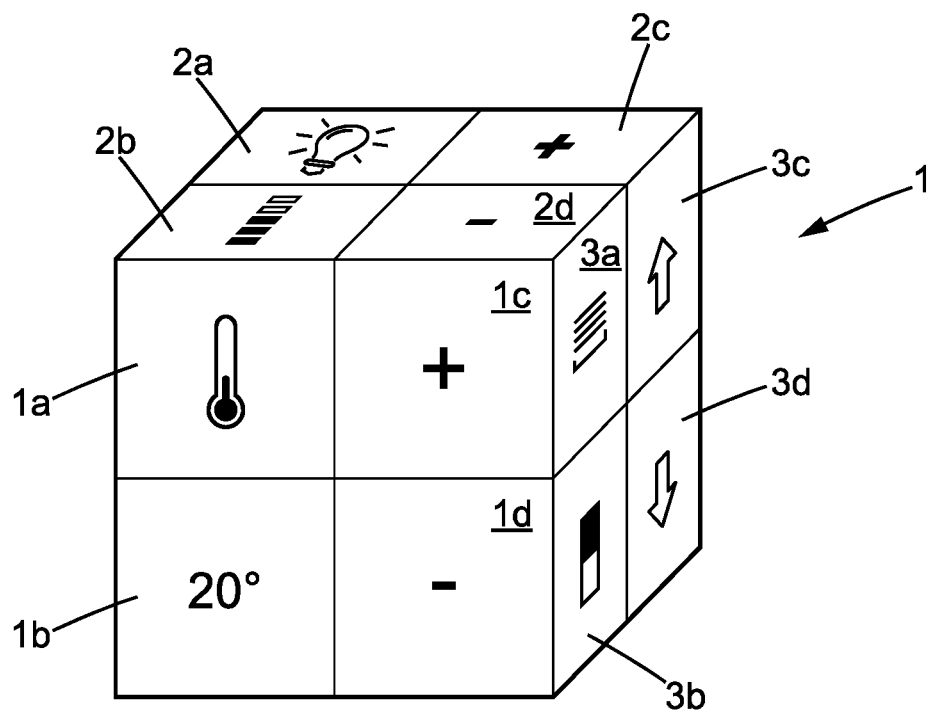
FIGS. 2a and 2b represent two particular embodiments of devices according to the invention.

Referring to the embodiment of FIG. 2a, the device 1 may have the form of a cube, of which each of the six faces is assigned to the control of a type of appliance. For example, the front face of the device 1 as represented in FIG. 2a may be assigned to the control of temperature regulation appliances, including the air conditioner 11, the top face may be assigned to the control of lighting appliances, including the standard lamp 12, and the face turned to the right may be assigned to the control of occulting appliances: including the rolling shutter 10. Possibly, two different faces of the device 1 may be assigned to two different functions of one and the same appliance, such as the heating temperature and the air conditioning fan flow rate 11.

In the embodiment of FIG. 2a, each of the faces of the device 1 is divided into four face parts, which are therefore juxtaposed in the face concerned. One of these face parts may be dedicated to indicating the type of appliance which is affected by the face, and at least one other of these face parts may be dedicated to indicating a control instruction which is proposed for the appliances of the type affected by the face. For example, for the front face of the device 1 of FIG. 2a, the face part 1a indicates the type of the air conditioning appliances, the face part 1c indicates an action to increase the setpoint temperature, and the face part 1d indicates an action to reduce the setpoint temperature. Thus, an activation of the face part 1c by a user of the device 1 corresponds to a control instruction to increase the temperature. The control instruction which is thus implemented results in the combination of the indication of the face part 1a, which has been called thematic control instruction element of the general part of the present description, with the indication of the face part 1c, which has been called control instruction element of action type. Similarly, an activation of the face part 1d by the user corresponds to a control instruction to reduce the temperature. This other control instruction results from the combination of thematic control instruction element of the face part 1a, with the control instruction element of action type of the face part 1d. The use of the face part 1b, for example to indicate the current setpoint temperature, is optional.

Similarly, the face part 2a indicates the lighting as thematic control instruction element, the face parts 2c and 2d indicate control instruction elements of action type, respectively to increase and to reduce the lighting intensity, and the face part 1b may optionally indicate a current lighting intensity, for example in the form of a scale with several levels. The juxtaposition of the indications of the face parts 1a and 1c, in the same face of the cube, constitutes the control instruction to increase the lighting intensity, and the activation of the face part 2c by the user of the device 1 corresponds to a command to increase the lighting. Likewise, the juxtaposition of the indications of the face parts 1a and 1d, also in the same face of the cube, constitutes the control instruction to decrease the lighting intensity, and the activation of the face part 2d by the user corresponds to a command to reduce the lighting.

Also likewise, the face part 3a indicates the rolling shutter 10 as thematic control instruction element, the face parts 3c and 3d indicate control instruction elements of action type, respectively to raise and to lower the rolling shutter 10, and the face part 3b may optionally indicate the current height level of the rolling shutter. The use of this other face of the device 1 to control an operation of the rolling shutter 10 is similar to that of the other two faces described previously.

The activation of a control instruction by the user of the device 1, for example by touching one of the face parts as indicated above, may be detected by a touch sensor which is incorporated in this face part. Such a touch sensor may be of the pressure sensor or electrostatic sensor type. It constitutes, with its controller, the input interface module which has been introduced into the general part of the present description. To identify which of the faces of the device 1 corresponds to the control instruction, which is activated deliberately by the user, compared to the control instructions which have not been selected by the user but which are inscribed on other faces of the device 1 that the user may touch accidentally, the activation of the selected control instruction may be performed by the user in the form of a touch contact which is repeated rapidly. Thus, the mode of activation of the control instruction which is wanted by the user allows the device 1 to identify unambiguously which of its faces is the one on which this control instruction is inscribed. This face has been called active face in the general part of the description. Other methods for identifying the active face may be used alternatively, particularly when the input interface module of the device 1 is provided with an accelerometer. In effect, such an accelerometer can make it possible to identify the active face, which is watched by the user, by detecting a displacement of the device 1 which is performed by the user to bring it closer to him or her. Also alternatively, the active face may be identified by a touch contact of the user on the face part 1b to designate the front face of the device 1 as active face, or on the face part 2b to designate the top face of the device 1 as active face, or on the face part 3b to designate the face of the device 1 which is turned to the right as active face, etc.

Preferably, each control instruction element may be inscribed on each face part of the device 1 in a modifiable manner. For that, each face part may be provided with a display which is controlled appropriately, as described hereinbelow. Such display may be of the electronic ink type, advantageous for the very low energy consumption that it causes, or of the light-emitting diode, or LED, type, advantageous for the high display contrast that it produces. Alternatively, each display may be of the retractable pin type, suitable for inscribing in braille the control instruction element in each face part.

When the device 1 is in standby state, the face parts which are assigned to the control instruction elements of action type may be switched off, and those which are assigned to display the real values of ambient parameters or the current setpoint parameters of the appliances, such as the face parts 1b, 2b and 3b, may be kept active. They may then be assigned to display the current ambient values of the parameters affected by the theme of the face. In this case, it may be advantageous for the face parts which indicate the thematic control instruction elements to be kept active in the standby state of the device, to facilitate the understanding of the displayed information by the user.

Figure 2B:
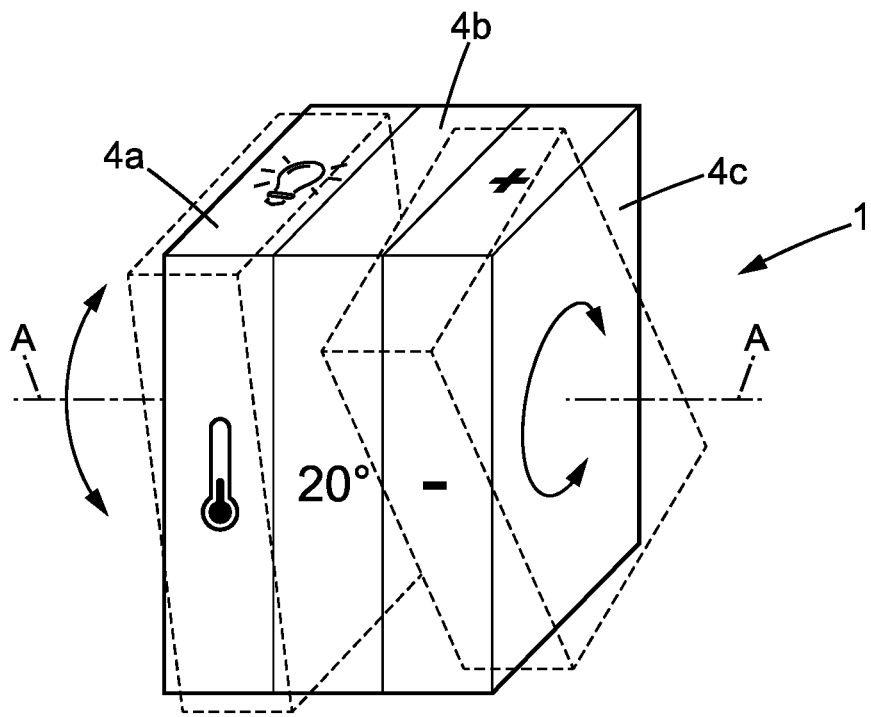

In the embodiment of FIG. 2b, the device 1 is composed of at least two mobile blocks, for example three mobile blocks 4a, 4b and 4c, which can turn relative to one another about an axis A-A. The control instruction elements are inscribed on those of the faces of the blocks 4a and 4c which are combined with one another variably in a face of the device 1 by the rotation of the blocks 4a and 4c. The device 1 may also have a general cubic form when the blocks 4a-4c are rotationally aligned to define a control instruction. For such an embodiment, the input interface module, which allows the user to activate a control instruction, is suitable for determining the relative positions of the blocks 4a and 4c, in order to identify which faces of these blocks, forming face parts of the device 1, are combined in one and the same face of the device. The activation of one of the control instructions which is composed by the user on one of the faces of the device 1, with the identification of this face as active face, can be detected in the same way as for the embodiment of FIG. 2a. For example, each face of the mobile block 4c may be provided with a separate touch sensor. Possibly, the block 4a may be dedicated to displaying thematic control instruction elements, and the block 4c may be dedicated to displaying control instruction elements of action type. In the example represented, the front face of the block 4a indicates the air conditioning as thematic control instruction element, and its top face indicates the lighting as alternative thematic control instruction element. Simultaneously, the top face of the block 4c indicates an increase as control instruction element of action type, and its front face indicates a reduction as alternative control instruction element of action type. The quarter-turn rotation of the block 4c relative to the block 4a therefore allows the user to compose control instructions according to all the combinations between the themes of the block 4a and the actions of the block 4c.

The block 4b of the embodiment of FIG. 2b, optional, may have the same function as the face parts 1b, 2b and 3b of the embodiment of FIG. 2a, when the device 1 is currently being used and/or when it is in the standby state.

Figure 3:
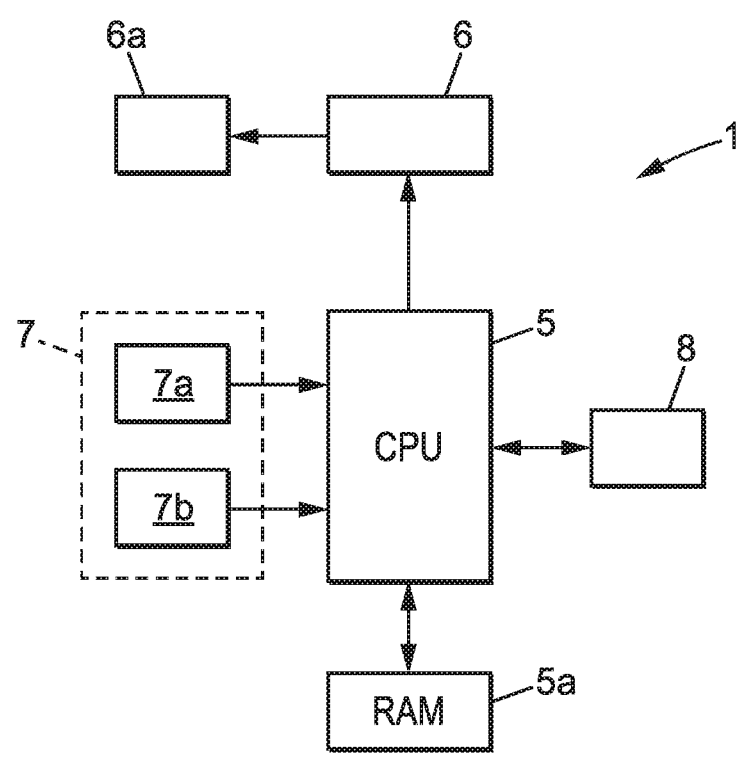
FIG. 3 shows components of a device according to the invention.

FIG. 3 illustrates different functional modules of a device 1 as described with reference to FIGS. 2a and 2b. The reference 5 designates a processor, denoted CPU, which is coupled to a memory 5*a*, denoted RAM, so as to be able to read and to write in the latter according to the needs of an operation of the device 1. An output of the processor 5 is connected to an input of an inscription module 6, which is itself connected to displays 6*a* so as to command the latter to display control instruction elements which are transmitted by the processor 5. The displays 6*a* are situated on face parts of the device 1. An input interface module 7 is connected to an input of the processor 5, to transmit to the latter signals which identify control instruction activations which have been input by the user. The input interface module 7 may comprise touch sensors 7*a* which are situated on at least some of the face parts of the device 1, and optionally a detector 7*b* which is suitable for identifying relative positions of mobile blocks which participate in forming the device 1, particularly in the embodiment of FIG. 2*b*. Possibly, the input interface module 7 may also comprise an accelerometer (not represented), a microphone (not represented) for inputting verbal instructions produced by the user, etc. The communication module 8 is coupled to the processor 5, so as to form a data communication interface between the latter and the service gateway 102, or directly with the network 100. Finally, the device 1 may also comprise other components which are not represented, including an electrical power supply battery, and optionally a loudspeaker, components for adjusting the operation of the device 1 itself, etc.

A method of using the device 1 is now described.

The device 1 may be initially in a standby state, and switches to a state of active operation for example when one of its touch sensors detects a contact with the user or the accelerometer detects a displacement of the device. The processor 10 can then establish a communication link with the management platform 101, to transmit to the latter a request to update data which relate to the appliances 10-12 that are likely to be remotely controlled by the user by means of the device 1. These data may comprise values of status parameters of the appliances 10-12, which indicate in particular the current state of operation of each of these appliances. These status parameter values may be transmitted to the management platform 101 by the platforms 110-112 which relate to these appliances, then retransmitted by the management platform 101 to the device 1. Possibly, the management platform 101 also collects updated data which characterize an existing context in the premises where the device 1 is located. These context data may be transmitted to it by at least one of the sensors 120-122 and/or the external platform 200. The management platform 101 may then also transmit these context data to the device 1, in particular for a display of some of these context data on some of the face parts of this device.

Preferably, the management platform 101 collects the values of the status parameters of the appliances 10-12, from the corresponding platforms 110-112, with possibilities of modifying the operation of these appliances. The management platform 101 can then, by using an appropriate program, select some of the possible modifications of the operation of each appliance, based on the current state of operation of this appliance and on the context data. In this way, only modifications of operation of the appliance will be proposed to the user, which are adapted to the context which exists at the moment when the user initiated a use of the device 1. Such a selection is called contextualization in the jargon of the person skilled in the art. It may also take account of the current time, and optionally of the habits of the user which have been able to be identified by a learning program. From these possible modifications of the operation of the appliances 10-12, possibly sorted by contextualization, the management platform 101 establishes an assignment of a control instruction which corresponds to each of these modifications of operation, to one of the faces of the device 1. Simultaneously, it assigns, for each control instruction, elements of this control instruction to the face parts of the face concerned. Such an assignment may link each control instruction element to a face part which may be designated by a respective identifier. Configuration data which represent this assignment are then transmitted by the management platform 101 to the device 1.

Generally for the use of a device 1 according to the invention, it may be advantageous for at least some of the control instruction elements which are assigned to the face parts of this device 1 to be received by the management platform 101 from at least one other platform which relates to one of the appliances, then for these control instruction elements to be retransmitted by the management platform 101 to the device 1.

The processor 5 then commands the inscription module 6 to inscribe the control instruction elements on the face parts identified by their identifiers, in accordance with the assignment data received.

The user activates one of the control instructions which are available, and which are presented to him or her by display on the faces of the device 1, in one of the ways which were described with reference to FIGS. 2*a* and 2*b*.

For the embodiment of FIG. 2*b*, the processor 5 modifies the received assignment between identifiers of face parts and control instruction elements, as a function of the displacement of the mobile blocks which is applied by the user. The modified assignment determines at least one new control instruction which is displayed and available to be selected by the user. This modified assignment is returned by the device 1 to the management platform 101.

The processor 5 then identifies the identifiers of the face parts which correspond to the control instruction elements of the control instruction which has been activated by the user. These identifiers of the face parts which correspond to the activated control instruction are then transmitted by the device 1 to the platform 101. The latter recovers the control instruction which has been activated, and can transmit it to the platform or platforms 110-112 which is or are dedicated to the appliance (or appliances) affected by the control instruction. This or these platform(s) trigger a modification of the operation of each appliance concerned in accordance with the control instruction.

Possibly, the modification of the operation of one of the appliances 10-12, as has just been described, may be completed by an updating of the control instructions which are proposed to the user on the device 1. For example, an increase in the lighting intensity which has just been activated by the user may trigger a proposal to lower the rolling shutter when a night hour is identified as the current time by the management platform, from the contextualization data. Then, the management platform 101 can determine a new assignment of control instruction elements to be inscribed on the face parts of the device 1, replacing the preceding ones. It sends this new assignment to the device 1, which uses it to update the display of the control instruction elements on the face parts of the device 1, some new control instruction elements being able to replace others previously displayed but which have become less relevant. The user can then activate another control instruction.

It is understood that the invention can be implemented by modifying some of the secondary aspects thereof with respect to the embodiments which have been described in detail, but while conserving at least some of the advantages which have been cited. In particular, the form of the device can be varied widely, to obtain forms other than a cube or a parallelepiped, with different numbers of faces.

The invention claimed is:

1. A device, to remotely control at least one operation of at least one appliance, and comprising:
   a plurality of faces;
   a processor, operationally coupled to a memory, the processor being configured to, for each of the plurality of faces, determine a control instruction for the appliance on the basis of a combination of a plurality of control instruction elements displayed on the face of the device, by configuration of different parts of the face on which are respectively inscribed the control instruction elements, said different parts of the face being juxtaposed in said face to form the combination of the control instruction elements;
   an inscription module, configured to inscribe on each of the plurality of faces, under control of the processor, the control instruction elements on the respective parts of the face of the device;
   an input interface module, configured to receive inputs from a user, the input interface module comprising a detection module configured to detect an activation of the control instruction of the appliance by the user; and
   a communication module, configured to send, to a management platform via a data communication network, data which represent the control instruction activated by the user,
   wherein the plurality of faces are assigned respectively to distinct types of appliance, to distinct appliances or to distinct appliance functions, said inscription module being also configured to present to the user on at least one of the plurality of faces at least one control instruction relating to the type of appliance, to the appliance or the appliance function corresponding to said face, and
   wherein the input interface module is also configured to allow the user to activate the control instruction of said face.

2. The device of claim 1, in which at least a first of the control instruction elements, which is inscribed on a first of the parts of the face of the device, is thematic, and designates a type of appliance concerned with the control instruction in which said control instruction element participates, and at least a second of the control instruction elements, which is inscribed on a second of the parts of said face of the device, is of action type and designates an operation command for at least one appliance of the type designated by the thematic control instruction element, in the same control instruction.

3. The device of claim 1, in which at least a plurality of the face parts of the device are provided with respective displays, the displays being driven by the inscription module,
   and in which the communication module is also configured to receive, from the management platform, control instruction elements which are available to be used with the device,
   and the inscription module is also configured to inscribe at least a plurality of the available and received control instruction elements on at least a plurality of the face parts which are provided with displays, according to an assignment to said face parts of said available and received control instruction elements.

4. The device of claim 3, in which the communication module is also configured to receive, from the management platform, data which specify the assignment of each available and received control instruction element to one of the face parts of the device, and the data which represent the control instruction activated by the user comprise an identification of a plurality of the face parts which correspond, by assignment, to the control instruction elements of the control instruction activated by the user.

5. The device of claim 1, in which the detection module comprises at least one sensor which is arranged on one of the face parts of the device, on which face part is inscribed one of the control instruction elements, said sensor being configured to detect an action of activation of the control instruction which is performed by the user, and, on detection of the activation action, in cooperation with the processor, triggering a sending by the communication module to the management platform of the data which represent the control instruction activated by the user.

6. A method for remotely controlling an operation of at least one appliance, by a device comprising:
   a plurality of faces;
   a processor, operationally coupled to a memory, the processor being configured to, for each of the plurality of faces, determine a control instruction for the appliance on the basis of a combination of a plurality of control instruction elements displayed on the face of the device, by configuration of different parts of the face on which are respectively inscribed the control instruction elements, said different parts of the face being juxtaposed in said face to form the combination of the control instruction elements;
   an inscription module, configured to inscribe on each of the plurality of faces, under control of the processor, the control instruction elements on the respective parts of the face of the device;
   an input interface module, configured to receive inputs from a user, the input interface module comprising a detection module configured to detect an activation of the control instruction of the appliance by the user; and
   a communication module, configured to send, to a management platform via a data communication network, data which represent the control instruction activated by the user,
   wherein the plurality of faces are assigned respectively to distinct types of appliance, to distinct appliances or to distinct appliance functions, said inscription module being also configured to present to the user on at least one of the plurality of faces at least one control instruction relating to the type of appliance, to the appliance or the appliance function corresponding to said face, and
   wherein the input interface module is also configured to allow the user to activate the control instruction of said face,
   the method comprising the following acts, executed by the device:
   /1/ establishing the data communication link between the device and the management platform;
   /2/ receiving from the management platform data for configuring at least a plurality of the face parts of the device by assigning respective ones of the control instruction elements to said plurality of face parts;
   /3/ inscribing the respective control instruction elements on the plurality of face parts to which said control instruction elements are assigned;
   /4/ receiving an input from the user on an active face of the plurality of faces, and activating the control instruction corresponding to the control instruction elements which appear on the active face of the device on the basis of the user input received; and /5/ sending to the management platform data which represent the control instruction which has been activated by the user.

7. The method of claim 6, the method further comprising:
receiving, from the management platform, the control instruction elements to be inscribed on a plurality of the face parts which are provided with displays; and
inscribing, on said plurality of the face parts which are provided with displays, the control instruction elements received from the management platform.

8. The method of claim 7, also comprising, in response to a current use of the device being detected:
inscribing on at least one face part which is in the active face, or which is available to be brought into the active face by the user, a replacement control instruction element which is available as replacement for the control instruction element inscribed previously on a face part of the active face.

9. The method of claim 6, in which:
the activation of the control instruction comprises:
determining a new control instruction to be applied to the appliance on the basis of a detection of a modification, by the user, of the combination of control instruction elements which appears on the active face of the device; and
the sending to the management platform of the data which represent the control instruction which has been activated by the user comprises: sending to the management platform data which represent the control instruction elements of the new control instruction.

10. A device, to remotely control at least one operation of at least one appliance, and comprising:
a face;
a processor, operationally coupled to a memory, the processor being configured to determine a control instruction for the appliance on the basis of a combination of a plurality of control instruction elements displayed on the face of the device, by configuration of different parts of the face on which are respectively inscribed the control instruction elements, said different parts of the face being juxtaposed in said face to form the combination of the control instruction elements;
an inscription module, configured to inscribe under control of the processor, the control instruction elements on the respective parts of the face of the device;
an input interface module, configured to receive inputs from a user, the input interface module comprising a detection module configured to detect an activation of the control instruction of the appliance by the user; and
a communication module, configured to send, to a management platform via a data communication network, data which represent the control instruction activated by the user,
a plurality of blocks, wherein a first of the plurality of blocks is mobile relative to at least a second of the plurality of blocks, and the first block that is mobile comprises a plurality of faces, which each form a distinct one of the different face parts of the device, such that a displacement of said first block that is mobile relative to the at least the second of the plurality of blocks modifies the face parts which are juxtaposed to form the combination of the control instruction elements, and wherein the input interface module is configured to detect the face parts which are juxtaposed by to select the control instruction.

11. The device of claim 10, in which at least a first of the control instruction elements, which is inscribed on a first of the parts of the face of the device, is thematic, and designates a type of appliance concerned with the control instruction in which said control instruction element participates, and at least a second of the control instruction elements, which is inscribed on a second of the parts of said face of the device, is of action type and designates an operation command for at least one appliance of the type designated by the thematic control instruction element, in the same control instruction.

12. The device of claim 10, in which at least a plurality of the face parts of the device are provided with respective displays, the displays being driven by the inscription module, and in which the communication module is also configured to receive, from the management platform, control instruction elements which are available to be used with the device, and the inscription module is also configured to inscribe at least a plurality of the available and received control instruction elements on at least a plurality of the face parts which are provided with displays, according to an assignment to said face parts of said available and received control instruction elements.

13. The device of claim 12, in which the communication module is also configured to receive, from the management platform, data which specify the assignment of each available and received control instruction element to one of the face parts of the device, and the data which represent the control instruction activated by the user comprise an identification of a plurality of the face parts which correspond, by assignment, to the control instruction elements of the control instruction activated by the user.

14. A method for remotely controlling an operation of at least one appliance, by a device comprising:
a face;
a processor, operationally coupled to a memory, the processor being configured to determine a control instruction for the appliance on the basis of a combination of a plurality of control instruction elements displayed on the face of the device, by configuration of different parts of the face on which are respectively inscribed the control instruction elements, said different parts of the face being juxtaposed in said face to form the combination of the control instruction elements;
an inscription module, configured to inscribe under control of the processor, the control instruction elements on the respective parts of the face of the device;
an input interface module, configured to receive inputs from a user, the input interface module comprising a detection module configured to detect an activation of the control instruction of the appliance by the user; and
a communication module, configured to send, to a management platform via a data communication network, data which represent the control instruction activated by the user,
a plurality of blocks, wherein a first of the plurality of blocks is mobile relative to at least a second of the plurality of blocks, and the first block that is mobile comprises a plurality of faces, which each form a distinct one of the different face parts of the device, such that a displacement of said first block that is mobile relative to the at least the second of the plurality of blocks modifies the face parts which are juxtaposed to form the combination of the control instruction elements, and wherein the input interface module is configured to detect the face parts which are juxtaposed by to select the control instruction, the method comprising the following acts, executed by the device:
- /1/ establishing the data communication link between the device and the management platform;
- /2/ receiving from the management platform data for configuring at least a plurality of the face parts of the device by assigning respective ones of the control instruction elements to said plurality of face parts;
- /3/ inscribing the respective control instruction elements on the plurality of face parts to which said control instruction elements are assigned;
- /4/ receiving an input from the user on an active face of the plurality of faces, and activating the control instruction corresponding to the control instruction elements which appear on the active face of the device on the basis of the user input received; and
- /5/ sending to the management platform data which represent the control instruction which has been activated by the user.

15. The method of claim 14, the method further comprising:

receiving, from the management platform, the control instruction elements to be inscribed on a plurality of the face parts which are provided with displays; and inscribing, on said plurality of the face parts which are provided with displays, the control instruction elements received from the management platform.

16. The method of claim 15, also comprising, in response to a current use of the device being detected:

inscribing on at least one face part which is in the active face, or which is available to be brought into the active face by the user, a replacement control instruction element which is available as replacement for the control instruction element inscribed previously on a face part of the active face.

17. The method of claim 14, in which:

the activation of the control instruction comprises: determining a new control instruction to be applied to the appliance on the basis of a detection of a modification, by the user, of the combination of control instruction elements which appears on the active face of the device; and the sending to the management platform of the data which represent the control instruction which has been activated by the user comprises: sending to the management platform data which represent the control instruction elements of the new control instruction.

* * * * *